INVENTORS
Robert J. deFasselle
Albert J. Vidmar
ATTORNEYS

INVENTORS
Robert J. deFasselle
Albert J. Vidmar
BY McCoy, Greene, Medert
& de Grotenhuis
ATTORNEYS

United States Patent Office 3,307,232
Patented Mar. 7, 1967

3,307,232
METHOD AND APPARATUS FOR FORMING SHELL MOLDS BY THE USE OF A FLUIDIZED BED DRYING SYSTEM
Robert J. de Fasselle, Gates Mills, and Albert J. Vidmar, Parma, Ohio, assignors to Edward J. Mellen, Jr., Cleveland, Ohio
Filed Jan. 4, 1965, Ser. No. 423,081
17 Claims. (Cl. 22—196)

The present invention relates to a process of and an apparatus for forming refractory shell molds on destructible patterns for investment casting and more particularly to a process and apparatus employing a fluidized bed for rapidly applying and drying the ceramic layers of the shell molds.

Heretofore, it has been extremely difficult to form satisfactory shell molds on large patterns formed of wax or other destructible material. If, for example, rather large shell molds are produced using the process disclosed in U.S. Patent No. 2,932,864, there is difficulty in producing high quality molds, particularly molds having intricate shapes. It is usually impractical to employ the process of that patent in making large shell molds because of the above difficulties and because of the need for drying tunnels of large cross section which are expensive and are neither necessary nor desirable for normal size patterns.

The present invention relates to a revolutionary new process which is superior to previously known processes for making refractory shell molds of ordinary size and which is particularly well suited for making shell molds of large size because of the ability to provide consistent high quality with equipment that is relatively inexpensive. The process of this invention is able to dry the individual ceramic layers of large shell molds more uniformly and more rapidly than previously known processes while at the same time effecting dusting of the wet-slurry-coated pattern with refractory granules. This is accomplished by employing a fluidized bed containing a body of refractory granules, by continually moving the pattern in the refractory body to cause the granules to contact all surfaces of the ceramic layer on the pattern, and by properly regulating the dry-bulb temperature and the vehicle or solvent vapor content of the air or other gas used to fluidize the bed so as to provide rapid drying while preventing damage to the shell mold by overheating or overcooling the pattern mold assembly.

The effect of dry-bulb temperature and vapor content of the drying gas in the process of this invention is unusual and quite different from the effect of these variables in the process of said Patent No. 2,932,864. In the process of that patent, the wetted pattern-mold assembly acts like a wet-bulb thermometer and tends to remain at the wet-bulb temperature of the air-water vapor mixture used as the drying gas. Thus, in that process, the wet-bulb temperature should not be low because of the strong tendency to lower the temperature of the pattern, but a rather high-dry-bulb temperature can be tolerated when the wet-bulb temperature is about the same as the normal pattern temperature. This is not true in the fluidized bed process of this invention. It has now been found that, within limits, the tendency of the hot drying gas in a fluidized bed to raise the pattern temperature can be offset, without causing undesirable cooling of the pattern, by lowering the vehicle wet-bulb temperature of said gas substantially below the pattern temperature. The refractory particles of the bed tend to remain at the same dry-bulb temperature and apparently assist in preventing cooling of the shell mold and pattern.

Fluidized beds, pressurized with air at room temperature, have been employed as dusting devices to apply stucco coats to a pattern after dipping in the ceramic slurry and before each drying operation, but such dusting devices tended to damage the molds if they were kept in the beds for substantial periods of time, and such dusting operations were carried out quickly (i.e., in less than 20 seconds) to avoid such damage. Heretofore, those skilled in the investment casting art had no idea that high quality shell molds could be produced using heated fluidized beds to effect rapid drying of each ceramic layer.

The quick dusting and drying provided by the process of this invention is important because it reduces the time required to produce the shell mold and the cost of such mold while at the same time improving its quality. The rapid drying makes it necessary to control the condition of the drying gas carefully to prevent damage to the shell mold but does not reduce the quality. Rapid dusting and drying actually provides much better shell molds, apparently by reducing the time available for migration of the colloidal silica or other binder to the surface.

The process of this invention may be performed using various slurry vehicles or solvents and various drying gases and is highly advantageous for making shell molds or similar articles on patterns made of various destructible materials such as mercury, wax, high-melt compositions, mercury alloys (see U.S. Patent No. 2,857,641), etc.

When the present invention is applied to the making of refractory shell molds on frozen-mercury patterns, it is highly advantageous for several reasons. Because the drying is effected while the pattern is submerged in the fluidized bed, there is less chance for damage to the shell mold due to exposure to moisture-laden air in the room. Because a stucco coat is applied after each slurry dip, the strength and quality of the shell mold is improved greatly. The quality can be further improved by reducing the dew point of the drying gas to a low value (i.e., $-100°$ F. or below) without requiring expensive drying equipment of large capacity, because a small volume of air is sufficient to fluidize the bed. It is thus possible to produce shell molds rapidly and economically with a minimum amount of refrigerated drying air using drying temperatures materially above the melting point of the mercury pattern (see, for example, the copending application of E. J. Mellen et al., Serial No. 286,010, filed June 6, 1963, now Patent No. 3,171,174).

The apparatus used in performing the process of this invention includes one or more dip tanks containing a ceramic slurry, one or more fluidized beds containing suitable refractory material, and air conditioning means for regulating the dry-bulb temperature and the vehicle or solvent vapor content of the drying gas entering each fluidized bed. Such apparatus preferably includes motor-driven means for causing relative rotation between the pattern and the fluidized bed and means for simultaneously reciprocating the pattern relative to the bed through a short stroke. A commercial apparatus would preferably include a prime dip tank, a concrete dip tank, one or more fluidized beds or trenches and an overhead conveyor system for carrying destructible patterns to each tank and to each bed. The trolley of each conveyor would preferably be provided with special means for supporting and rotating two patterns at once and means for reciprocating the patterns vertically.

Because the process of this invention makes it possible to use the same drying conditions for most or all of the ceramic layers of the shell mold, it is practical to provide simple equipment which employs a very small number of fluidized beds or a fluidized trench and timers for automatically lifting the patterns out of the beds or the trench after a predetermined period of time.

An object of the present invention is to provide a simple process which is well suited for forming high quality shell molds on patterns formed of various destructible materials such as wax, mercury, mercury alloys, high-melt compositions and the like.

Another object of the invention is to improve the quality and reduce the cost of refractory shell molds formed on large patterns.

A further object of the invention is to provide more rapid and more uniform drying of the individual layers of a shell mold to improve the quality of such molds.

A still further object of the invention is to provide a means for simultaneously dusting and drying a dipped destructible pattern during the manufacture of a shell mold.

Another object of the invention is to provide a simple, inexpensive apparatus for mass production of large shell molds, which requires a minimum amount of space.

Another object of the invention is to provide drying apparatus which requires a minimum amount of conditioned air, thereby reducing the cost of supplying such air.

Another object of the invention is to improve the quality of shell molds made on frozen-mercury patterns.

A still further object of the invention is to provide improved dusting and drying of the upper portions of a shell mold when submerging the mold in a fluidized bed.

Another object of the invention is to provide uniform drying on shell molds having complicated shapes.

A further object of the invention is to improve the quality of shell molds by eliminating the adherence of loose excess refractory material after the dusting operation.

Other objects, uses and advantages of the present invention will become apparent to those skilled in the art from the following description and claims and from the drawings, which are drawn substantially to scale and in which like parts are identified by the same numerals throughout the several views.

Figure 1:
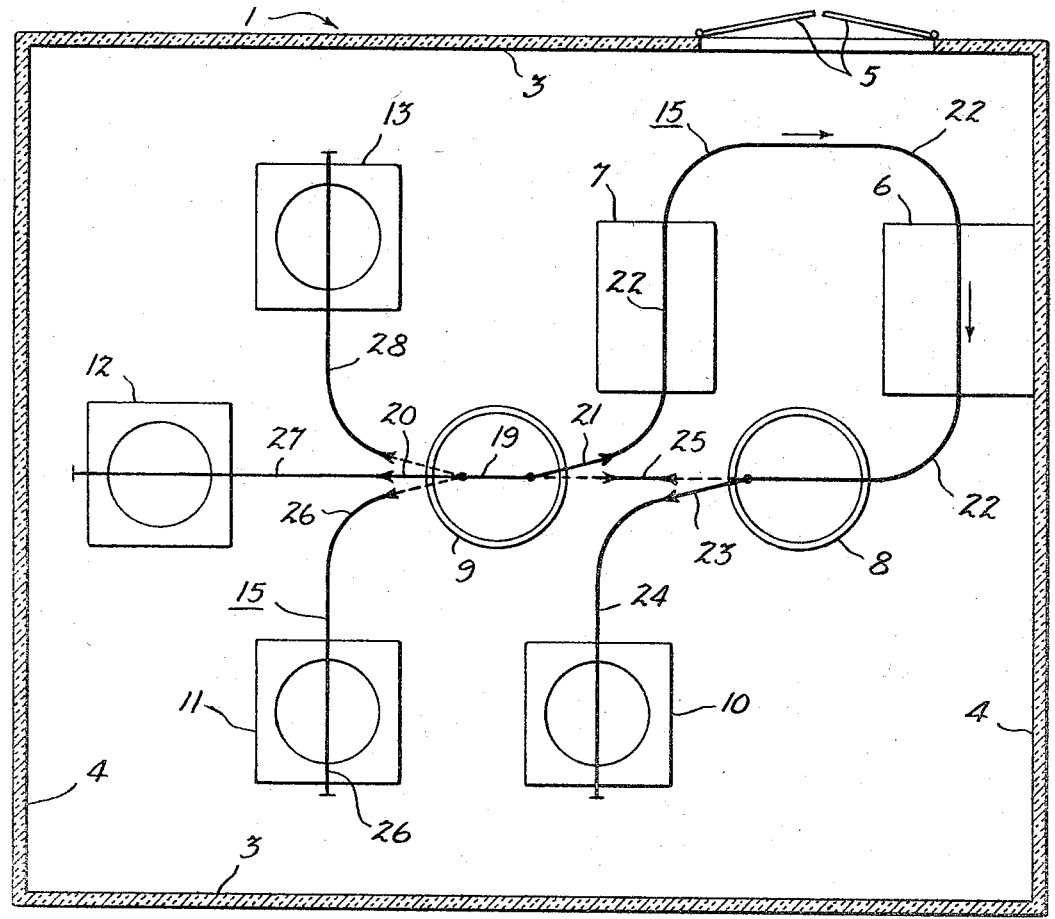
FIGURE 1 is a diagrammatic top plan view with parts omitted and the walls shown in section showing the apparatus of this invention.

The process of the present invention is somewhat similar to known processes for making thin-walled refractory shell molds and involves repeatedly dipping a destructible pattern of a predetermined size and shape in a ceramic slurry, dusting the wet ceramic layers with refractory granules, and heating the coated pattern after each dipping and dusting operation to evaporate the slurry vehicle or solvent. However, the process is quite different from any previously known process because the dusting and drying operations are carried out simultaneously after each application of the ceramic slurry by placing the coated pattern in a fluidized bed or trench containing a body of refractory granules of a size suitable for dusting and forcing a conditioned drying gas through the refractory body under a pressure sufficient to fluidize the refractory body and to permit submerging of the destructible pattern in said refractory body.

Such pressure may range from a few ounces to 25 or 30 pounds per square inch or more depending upon the construction of the bed, the fluidization characteristics of the refractory material, the viscosity and density of the gas media applied to the bed, and the desired drying rates. Usually the pressure employed is between 1 and 25 pounds per square inch.

The dry-bulb temperature and the vehicle or solvent vapor content of the drying gas entering the fluidized bed is carefully regulated to provide rapid drying and to prevent damage to such mold due to excessive heating or cooling. The dry-bulb temperature of the drying gas is preferably maintained at least 5° F. greater than the temperature of the ceramic slurry or the normal pattern temperature, the maximum dry-bulb temperature usually being no more than 100° F. greater than the slurry temperature, depending on the type of pattern material, the type of mold materials, the coefficient of expansion, and other variables. The vehicle wet-bulb temperature or vapor content of the drying gas should be reduced as the dry-bulb temperature of the gas increases to offset the tendency of the gas to raise the pattern temperature.

The slurry temperature is preferably maintained at a substantially constant value below the melting point and the softening point of the pattern material and below the boiling point of the slurry vehicle. The slurry temperature is equal to or about equal to the pattern temperature and must be low enough to maintain the shape of the pattern. If the pattern is formed of frozen mercury, then the slurry vehicle may be a halogenated hydrocarbon, such as monochlorodifluoromethane or dichlorodifluoromethane, and the slurry temperature may be −50° F. to −70° F. or lower. If, however, the pattern is formed of a material, such as a wax, which is solid at room temperature, then it may be preferable to use water as the slurry vehicle and to maintain the slurry temperature in the neighborhood of room temperature (i.e., about 70° to 85° F.).

In order to prevent damage to the shell mold, the pattern should be maintained at a temperature close to the slurry temperature during the drying operation in the fluidized bed by proper control of the dry-bulb temperature and the vehicle or solvent vapor content of the drying gas. During the drying and before all of the liquid has been evaporated, the pattern tends to assume a temperature between the dry-bulb temperature and the vehicle wet-bulb temperature of the drying gas. The degree to which the pattern is heated or cooled is dependent on many variables, among which are the velocity, temperature and vehicle vapor content of the drying gas, the characteristics of the refractory material in the bed, the number of coats on the pattern, and the shape and size of the pattern. Because of the large number of variables, some experimentation is necessary to determine the ideal conditions for the drying gas, but this is a routine matter to one who understands the principles of this invention, particularly when considering the fact that the potential cooling effect of the drying gas increases generally in proportion to the reduction in the partial pressures exerted by the condensable vapors of such gas. It is, of course, necessary to provide a dry-bulb temperature much higher than the vehicle wet-bulb temperature in order to obtain the desired high rate of evaporation of the slurry vehicle from the coated pattern.

The tendency of the drying gas of the fluidized bed to cool the pattern and the shell mold thereon depends on the rate of evaporation of the slurry vehicle or solvent, which may be a liquid other than water. The term "vehicle wet-bulb temperature" is used herein in conjunction with the drying gas to designate the equilibrium temperature attained by a small surface of the (liquid) slurry vehicle or solvent evaporating into a large amount of said gas. As used in this application in conjunction with the vapor content of a gas the term "wet-bulb temperature" does not necessarily refer to water but rather to the solvent or vehicle used in the ceramic slurry.

The vehicle wet-bulb temperature of the drying-gas indicates the partial pressure of the vapors in said gas. Thus, if a drying gas has a vehicle wet-bulb temperature about 5° F. below the slurry temperature, then the total partial pressure of the vapors in said drying gas is equal to the saturated vapor pressure of the slurry vehicle or solvent which exists at a temperature about 5° F. below said slurry temperature.

The cooling effect on the coated pattern due to evaporation of the free or uncombined water or other liquid is reduced as the ceramic layers approach the dry state; and, therefore, the drying of each layer (execpt the last layer) is preferably discontinued before all of the free liquid slurry vehicle or solvent is evaporated. As is well known in the art, a small amount of slurry vehicle remaining in the ceramic layers of the shell mold will not interfere with the application of subsequent layers. However, during the drying operation, after each slurry dip, a substantial amount and preferably a major portion of the free liquid carried by the ceramic layers of the pattern-mold assembly is evaporated before the next slurry dip. The amount of the liquid slurry vehicle or solvent evaporated during each drying operation should, of course, be sufficient to permit proper forming of the shell mold and proper adhesion of one ceramic layer to the next, and such amount is preferably such that the surface temperature of the shell mold begins to increase at a rapid rate before the mold is removed from the fluidized bed.

After the last layer is applied to the shell mold, it is necessary to dry the mold thoroughly. This layer may be subjected to drying for a predetermined time in the fluidized bed like the previously applied layers, and the pattern-mold assembly may then be removed from the bed, placed in a special drying zone, and kept there for a period of time sufficient to remove substantially all of the free moisture or other liquid. The pattern-mold assembly may, for example, be stored 24 hours or more in a drying room containing air or other gas having a temperature substantially above the slurry temperature or the normal pattern temperature and having a relatively low vapor content (i.e., a relative humidity below 25%) provided that the conditions are selected to avoid a rapid change in the temperature of the mold and the pattern.

If it is desired to accelerate the final drying operation, to minimize exposure of the shell mold to the surrounding air, or to eliminate the expense of a separate drying room, then the finished shell mold may be allowed to remain in the fluidized bed for an extended period of time after applying the last layer of the mold. It is, of course, necessary to control the drying air or gas in such a way as to prevent damage to the mold by over-heating of the pattern. For example, the pressure of the drying gas in the bed may be reduced after most of the liquid has been evaporated from the finished shell mold to provide a slow movement of such gas over the surface of the mold in said bed. If desired, the actual temperature of the drying gas could be reduced when the pressure is reduced to further reduce the rate of heating of the mold. However, the temperature of the drying gas may be much higher than the slurry temperature or the normal pattern temperature if the rate of heat transfer to the mold is limited to avoid damage thereto.

Increasing the velocity of the drying gas has little effect on the rate of evaporation during the final drying operation because of the slow migration of liquid to the surface of the shell mold. Therefore, it is important to employ a drying gas which has a very low vapor content when drying the finished shell mold. The use of relatively dry gas for drying is particularly important when performing the final drying operation in a fluidized bed because of the small volume of gas moving through the bed. For this reason, drying of a wet shell mold in a fluidized bed would be too slow if the wet-bulb temperature of the fluidizing gas were equal to the normal pattern temperature.

If, for example, the fluidized-bed process of this invention is to be performed using a wax pattern and using water as the slurry vehicle, then the air or other drying gas would preferably have a dry-bulb temperature 5° to 50° F. above the slurry temperature and a wet-bulb temperature at least 5° F. below said slurry temperature and sufficiently low to prevent overheating of the shell mold or the pattern during the drying operation. The wet-bulb temperature employed can be extremely low to offset a high dry-bulb temperature, but it is costly and usually impractical to maintain the wet-bulb temperature more than 100° F. below the slurry temperature. The preferred upper limit on the dry-bulb temperature is determined, to a large extent, by the softening range of the wax used to form the patterns and is about 120° F. for the most common wax patterns, although higher temperatures can be used.

A typical commercial process, using a wax pattern and an aqueous slurry, could, for example, employ a pattern temperature and a slurry temperature of 75° to 80° F. and employ a drying gas in the fluidized bed having a dry-bulb temperature of 80° to 120° F. and a wet-bulb temperature of 49° to 75° F. The ambient conditions in the work room would preferably be at the comfort air conditioning level (i.e., a dry-bulb temperature of 80° F. and a wet-bulb temperature of 67° F.), although any ambient temperature below the melting point of the wax could be used.

The fluidized-bed process of this invention could be used to perform the process of said Patent No. 3,171,174, using frozen-mercury patterns. In that case, the air or other drying gas used in the fluidized bed would preferably have a dry-bulb temperature 10° to 100° F. above the slurry temperature and a vehicle wet-bulb temperature at least 10° F. below said slurry temperature. Again the vehicle wet-bulb temperature can be very low to offset a high dry-bulb temperature, but it is usually preferred not to employ a vehicle wet-bulb temperature more than 100° F. below the slurry temperature.

A typical commercial process, using a mercury pattern and other conventional materials and using monochlorodifluoromethanes as the slurry vehicle, could, for example, employ a slurry temperature of −55° to −65° F. and employ a fluidizing gas with a dry-bulb temperature of −10° to +10° F. and a vehicle wet-bulb temperature of −155° to −90° F. The air or other gas in the room which contacts the shell molds and also the drying gas supplied to the fluidized bed must have a dew point below −60° F. and below the slurry temperature to prevent frosting of the suraces and preferably have a dew point of −100° F. or below. It will be apparent that various conventional materials may be used in the practice of the invention including those disclosed in U.S. Patent No. 2,682,692, U.S. Patent No. 2,820,268 and U.S. Patent No. 2,912,729.

The present invention may be practiced in many different ways by varying the temperature, pressure and/or vapor content of the drying gas and by changing conditions from the time the drying of each layer of the mold is initiated to the time it is terminated. Thus, the dry-bulb temperature, vapor content and pressure of the drying gas could be changed as the moisture content of the pattern decreased, in which case the dry-bulb temperature could be higher at the beginning of the drying cycle. However, the refractory particles of the bed resist any rapid changes in temperature and tend to assume a temperature equal to the dry-bulb temperature of the drying gas. It is usually preferable to employ simple equipment and to maintain the condition of the drying gas at one fluidized bed the same at all times. For similar reason, it is desirable to employ the same drying gas for several different beds as in the equipment shown in the drawings.

The fluidized bed process of this invention is particularly advantageous because it permits mass production of high quality molds using the same fluidized bed or trench and the same drying conditions for all or substantially all of the layers of the shell mold. Of course, the ideal drying conditions and drying times change as the number of layers of the shell mold increases, and it is more difficult to avoid damage to the first layer because it contains less liquid and dries much more rapidly.

Thus, it is often desirable to reduce the drying rate and the drying time for the first ceramic layer of the mold and to provide a separate fluidized bed having a dry-bulb temperature at least 10° F. below that in another bed used to dry a subsequently applied layer. However, it is possible and often feasible to provide the same drying time and the same drying conditions for all the ceramic layers of the shell mold when employing the novel process of this invention, as, for example, when using an endless conveyor to carry the patterns to the fluidized beds.

In practicing this invention, various slurry vehicles or solvents may be employed including alcohols, halogenated hydrocarbons, water, etc. as is well known in the art. The type that is suitable depends upon the type of materials used to form the pattern and the shell mold and the desired characteristics of the mold. Also, the type of drying gas used to fluidize the bed may vary in accordance with the type of slurry and the type of mold being made. In some cases, it is desirable to employ an inert gas or a non-reactive gas, such as nitrogen, to prevent any chemical reaction. In other cases, it may be desirable to incorporate in the drying gas a chemical compound, such as ammonia or carbon dioxide, which provides a beneficial reaction with the materials of the ceramic slurry when the coated pattern is placed in the fluidized bed. Of course, the drying gas and any vapors present therein should be compatible with the particular slurry materials used to coat the shell mold.

When attempting to improve the quality of the shell molds, it is desirable to maintain the wet-bulb and dry-bulb temperature of the enclosure rather close to the pattern temperature, but it is possible to operate satisfactorily in a room which has vastly different temperature-humidity conditions, particularly when the exposure of the assembly to the room conditions is held to a minimum. Thus, it is possible to operate during the summer months with temperatures considerably above the pattern temperature. Excellent results can be obtained, for example, using wax patterns in equipment of the type shown herein where the room air has a dry-bulb temperature of 85° F. and a humidity low enough for operator comfort even though the pattern temperature or slurry temperature is only 80° F.

One advantage of submerging a shell mold in a fluidized bed according to the present invention is the reduction in the time the shell molds and the patterns are exposed to the surrounding atmosphere. This tends to reduce the problems created by the presence of undesirable vapors or gases in the air or the use of an atmosphere having a temperature above the softening point of the pattern material. Thus, there is less need for expensive air-conditioning equipment to control the condition of the atmosphere surrounding the fluidized bed and more opportunity to select conditions which will be acceptable to those operating the equipment.

FIGURES 1 to 4 show an apparatus designed for mass production of shell molds which can perform the process of this invention effectively with a minimum amount of equipment and a minimum amount of labor. The apparatus is enclosed in a closed sealed room 1 having top, side and end walls 2, 3 and 4 which are preferably insulated and vapor sealed consistent with normal good comfort air conditioning practice. One side wall is provided with an entrance opening which is closed by a pair of swinging doors 5. The doors provide access to a loading area 6 and an unloading area 7 and permit movement of trucks or dollies into the closed room for loading and unloading purposes. A rotating prime dip tank 8 and a similar rotating concrete dip tank 9 are located in the room 1 midway between the opposite side walls, and four fluidized beds 10 to 13 are regularly spaced around the tank 9, the bed 10 being a prime dust bed for dusting and drying the first ceramic layer applied to the pattern and the other beds being used for subsequent dusting and drying operations.

The temperature and humidity of the air in the room 1 are preferably maintained at a constant value by conventional air conditioning equipment (not shown), but this is not essential.

A multiple trolley conveyor system 14 is provided above the dip tanks and the fluidized beds for supporting several relatively large wax patterns and carrying them from station to station. The conveyor means includes an I-beam track 15 and three or four conventional trolleys 16, each having four wheels 17 which ride on the lower flange of the I-beam in the usual manner. The central part 19 of the track 15 is provided with pivots at opposite ends to support conventional switches 20 and 21 which are shown diagrammatically in FIGURE 1. The switch 21 connects to the end of the loop portion 22 of the track 15 when it is in the position shown in solid lines in FIGURE 1, said loop portion carrying the trolley over the areas 6 and 7 as shown in the drawings. A switch 23 similar to the switches 20 and 21 is provided at the other end of the portion 22 and has a first position connecting the loop 22 to the side track 24 and a second position connecting said loop to the track portion 25 located between the switches 21 and 23. The side track 24 leads to a position directly above the central axis of the prime dust bed 10 and similar side tracks 26, 27 and 28 lead from the switch 20 to positions above the central axis of the fluidized beds 11, 12 and 13 respectively.

Each of the dip tanks 8 and 9 is preferably provided with motor-driven means 30 for rotating the tank about its vertical axis. Such driving means includes a reduction gear box 31 and an electric driving motor 32.

Figure 2:
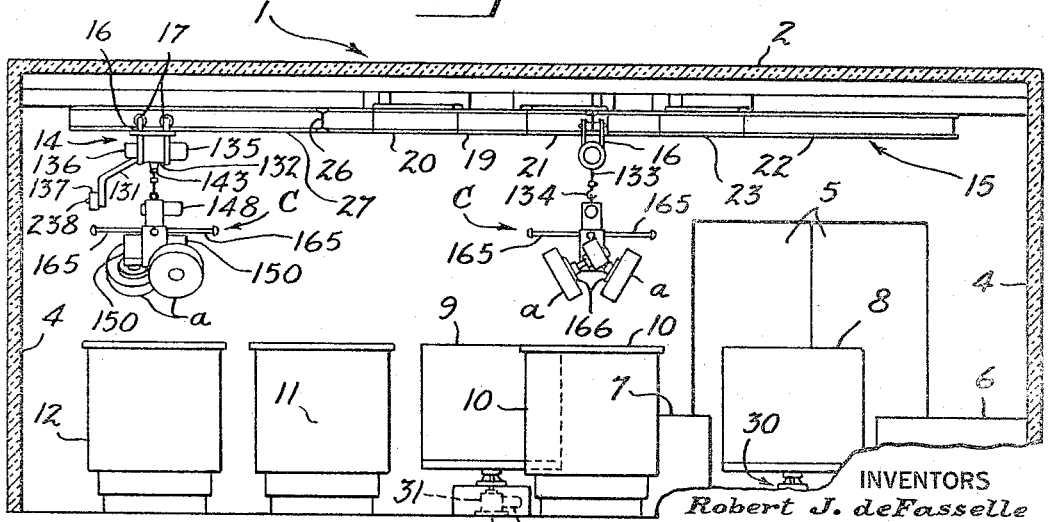
FIGURE 2 is a fragmentary side elevational view of the apparatus of FIGURE 1, the top and side walls being shown in section.

In performing the process of this invention with the three or four trolleys 16 that are mounted on the track 15, each wax pattern $a$ is removed from the loading area 6 and mounted on the rotator assembly C carried by one of the trolleys. Such assembly may be lowered to a position on the table at 6 to facilitate such connection. After one or two patterns $a$ are mounted on the rotator assembly, the assembly is lifted on the trolley to an elevated position, as shown in FIGURE 2, for example, and the trolley is moved on the track portion 22 first to the dip tank 8, then on the track portion 24 to the bed 10, back to the tank 8 for a second dip, and then over the switch 23, the track portions 19 and 25 and the switches 20 and 21 to one of the three side tracks 26, 27 and 28. After the pattern carried by the trolley has been dried in one of the fluidized beds 11, 12 and 13, it is returned to the dip tank 9 for another coating operation and again returned to one of the fluidized beds. This operation is repeated to build up the desired number of concrete ceramic layers on the shell mold in accordance with the method disclosed herein, and, when the mold is completed, the trolley for that mold is moved back over the switch 20 and the switch 21 to the loop portion 22, the finished shell mold being removed at the unloading area 7. This process is performed on the pattern or patterns of each trolley, the apparatus shown herein being designed to permit simultaneous use of three trolleys and simultaneous manufacture of as many as three pairs of shell molds as will be described in more detail hereinafter.

The apparatus used to perform the method of this invention may employ various means for regulating the dry-bulb temperature and vapor content of the drying gas supplied to each fluidized bed. The wet-bulb temperature may be regulated indirectly by maintaining a constant absolute or specific humidity (i.e., a constant dew point between 20° and 50° F.) and by regulating the dry-bulb temperature of the air entering the fluidized bed. By having a common source of air at constant pressure for several fluidized beds, and a single air conditioning means providing a common source of air with a predetermined absolute humidity, it is possible to carry out the process of this invention merely by providing separate dry-bulb temperature controls and separate heating means for each fluidized bed. This type of apparatus is preferred because of its simplicity although it will be apparent that each fluidized bed may have its own turboblower, refrigeration system and metering control.

Figure 3:
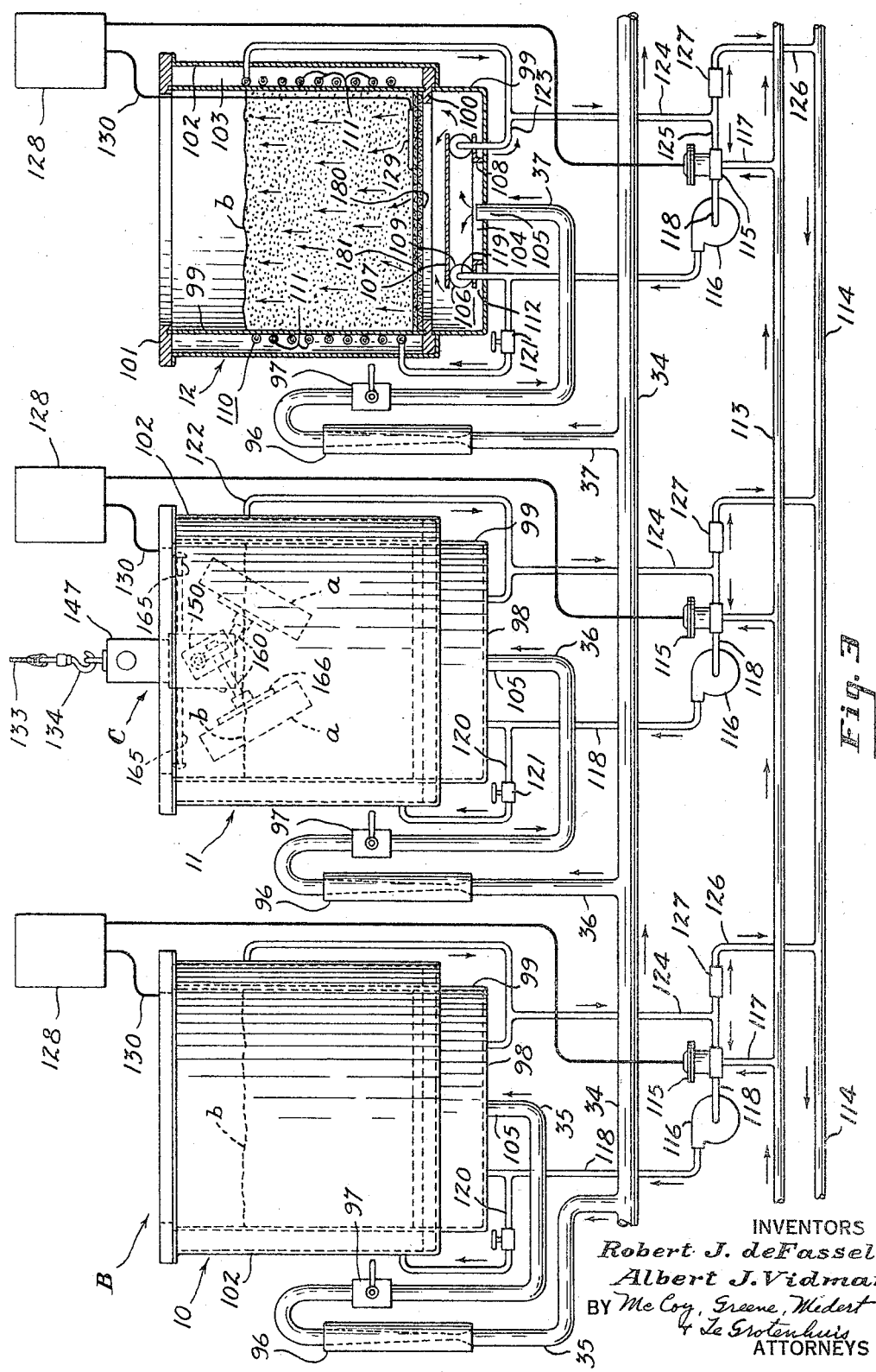
FIGURES 3 and 4 are diagrammatic side elevational views showing the apparatus associated with the fluidized beds for conditioning the air and controlling the dry-bulb and wet-bulb temperatures at each bed.
Figure 4:
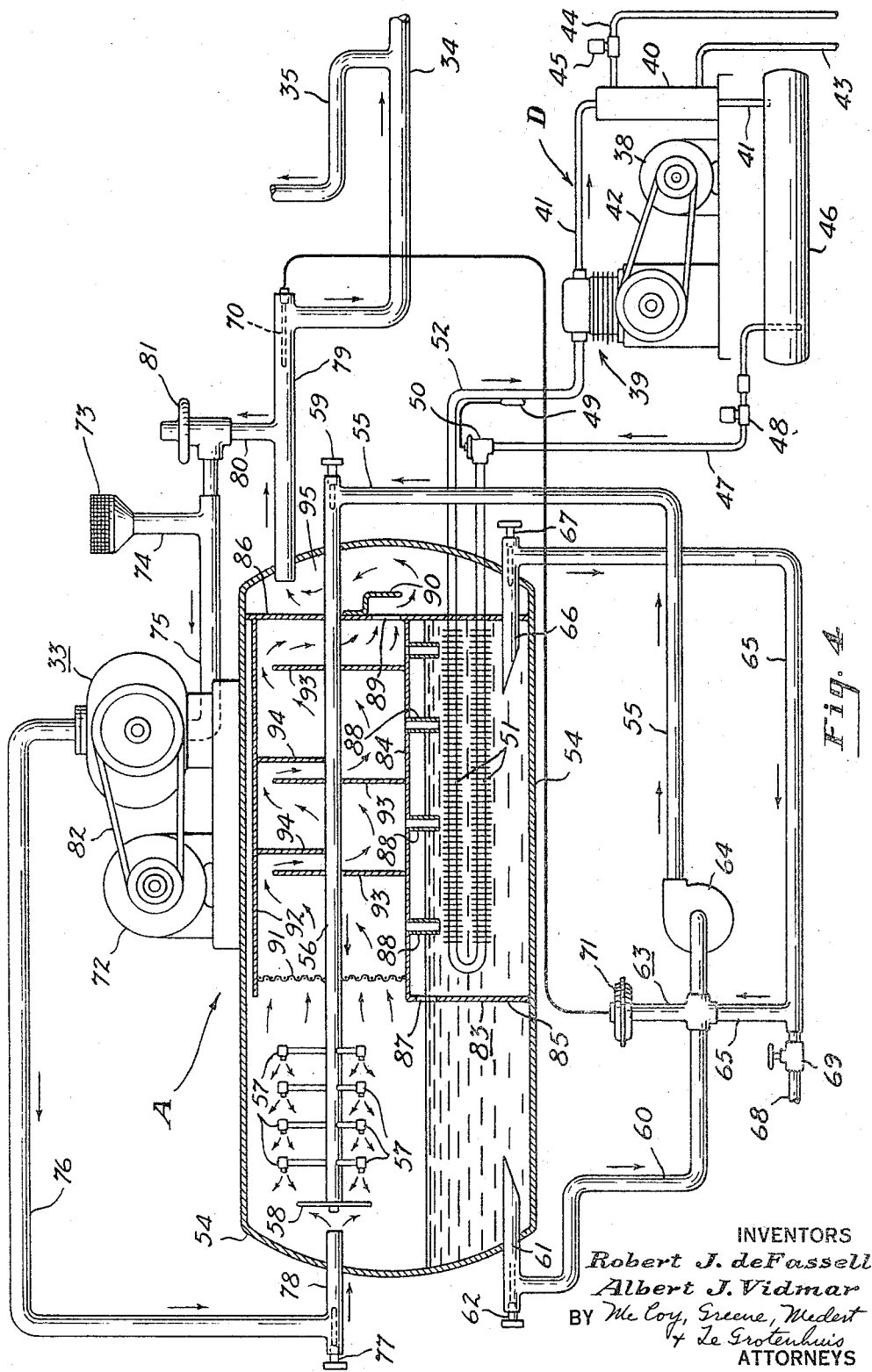

FIGURES 3 and 4 show air conditioning apparatus A and a fluidized bed system B having a common air supply for all of the four fluidized beds. As shown in FIGURE 4, the apparatus A includes an air compressor 33 and its associated equipment which supplies air under regulated pressure to a common conditioned air supply line 34 leading to all of the fluidized beds 10 to 13. A branch conduit 35 leads from the line 34 to the prime dust bed 10, the branch conduit 36 supplies the bed 11, the branch conduit 37 supplies the bed 12, and a similar branch conduit (not shown) supplies the bed 13.

A refrigeration apparatus D is provided to cool the water of the air conditioning apparatus A, said apparatus having an electric motor 38 which drives a conventional compressor 39 through a driving means including a drive belt 42. The apparatus also includes a condenser 40 or the like having cooling fluid lines 43 and 44 and a conventional valve 45 to regulate the flow of cooling fluid through the condenser 40. The conduit 41 carries the refrigerant through the condenser 40 and discharges into a conventional receiver 46. The pressure provided by the compressor 39 forces the refrigerant through the conduit 41 into the receiver 46 through a supply line 47 having a conventional solenoid valve 48 and a conventional thermal expansion valve 50 at the inlet end of the cooling coil 51. The temperature sensing element 49 of the valve 50 is preferably located adjacent the return line 52 leading from the coil 51 to the inlet of the compressor. The refrigeration apparatus D is conventional and forms no part of the present invention except in the novel arrangement of the cooling coil 51 in the novel apparatus A.

The apparatus A also includes a closed air cooling tank 54 which receives cold water from a water supply line 55 having a horizontal portion 56 rigidly mounted in the tank. A series of radially arranged spray nozzles 57 are mounted in regularly spaced relation near the end of the conduit portion 56, each nozzle being aligned longitudinally with four other nozzles and being spaced 120° from each of the other two rows of nozzles. A flat deflecting plate 58 is rigidly mounted on the end of conduit portion 56 to deflect the air leaving the air pipe 78.

The water is forced through the supply line 55 into the tank 54 by a motor-driven pump 64 which has its inlet end connected to the discharge end of a three-way mixing valve 63. Water is removed from the tank by two return conduits 60 and 65 which discharge into the inlets of the valve 63. The horizontal drain inlet portions 61 and 66 of the return conduits are provided with thermometers 62 and 67, respectively, similar to the thermometer 59 of the supply line 55, which indicate the water temperature. A line 68 with a diameter less than that of the lines 55, 60 and 65 is provided for make-up water, the amount of such water being controlled by the manual valve 69.

The mixing valve 63 provides a means for regulating the temperature of the water in the line 55 by controlling the amount of warmed water from line 60 which is mixed with the cooled water in line 65. An air temperature sensing element 70 and a conventional valve actuating means 71 are provided for regulating the mixing valve 63, such means being well known in the art for the purposes of temperature control. When the element 70 indicates an air temperature higher than the desired temperature, the actuating means 71 moves the valve 63 in a direction to reduce the amount of water flowing from conduit 60 to the pump 64, thereby effecting a reduction in air temperature. The opposite occurs when the sensing element 70 indicates an air temperature below the desired temperature.

The air compressor 33 is driven by an electric motor 72 through a conventional driving means including a drive belt 82. The compressor draws air through the air inlet filter 73 and the air inlet conduit 74 to the compressor inlet line 75 and discharges the air through supply line 76 to the horizontal discharge pipe 78, a thermometer 77 being provided at the inlet end of said pipe. The air thus enters one end of the tank 54. After air has been cooled in said tank to remove moisture, it leaves the tank through the horizontal air collecting line 79 which carries the air past the sensing element 70 to the common supply line 34. A by-pass line 80 leads from the line 79 to the inlet line 75 and has a conventional one-way pressure relief valve 81 which may be set to maintain any desired pressure in the line 34. Such pressure is usually at least 3 pounds per square inch and may be five to ten pounds per square inch or more depending upon the construction of the fluidized beds, the drying rates which are desired, and the fluidization characteristics of the solids.

The tank 54, in which the air is conditioned, is provided with a cooling section 83 formed by a flat top wall 84, a flat vertical front wall 85, and a flat vertical wall or partition 86, which extends the full diameter of the tank. The walls 85 and 86 close the opposite ends of the section 83 and maintain the cold water around the cooling coil 51 so that the water draining out of the tank at the outlet 66 has a much lower temperature than the water leaving the tank at 61. The wall 84 has an overflow opening 87 near the top wall 84 to permit flow of the warmed water below the nozzles 57 to enter the refrigerated receptacle 83.

The top wall 84 has openings therein in alignment with a series of short vertical drain pipes 88 which lead from the wall 84 to a position a short distance below the bottom edge of the opening 87, whereby each of the pipes 88 is submerged in the water.

The vertical partition 86 is provided with an air outlet opening 89 just above the wall 84 which leads to the chamber 95 at the end of the tank whereby the cooled dry air can move through the chamber 95 into the conduit 79. A metal deflector plate 90 is preferably provided at the opening 89 to deflect the air downwardly to assist in removal of condensed moisture which may exist in droplet or fog form.

Above the horizontal wall 84 there is a top cylindrical plate 92 to minimize transfer of heat and to provide an air passage above the section 83. A vertical screen 91 covers the inlet end of this air passage, and a series of vertical flat baffle plates 93 and 94 are mounted in fixed positions on the horizontal pipe 56 to cause the air to move in a tortuous path as indicated by the arrows in FIGURE 4.

The apparatus of FIGURE 4 serves as a common source of conditioned pressurized air for all of the fluidized beds and maintains a substantially constant pressure in the supply line 34 while maintaining the dew point of the air at a substantially constant value below 50° F., such as 32° to 40° F. If desired, when using water as the cooling medium, an ice bank may be employed to provide a spray temperature at the nozzles 57 only slightly above 32° F., whereby cooling and subsequent dehumidification provides the air with a low dew point (for example, below 40° F. in equipment of the general type shown herein).

The temperature of the water in the cooling section 83 may be maintained by the refrigerating apparatus D at a temperature equal to or slightly above 32° F. by supplying to the cooling coil 51 a suitable refrigerant, preferably a non-toxic liquid such as dichlorodifluoromethane or other fluorinated hydrocarbon. A temperature lower than 32° F. can be obtained using water in the tank 54 if the water contains additives which lower the freezing point, and much lower temperatures may be used if a liquid other than water is employed; however, it is usually preferable to operate with ordinary water, particularly when handling wax patterns.

If the slurry vehicle is a water base, the coolant used in the spray dehumidifying apparatus should be a water base coolant. Thus, the coolant could be a salt brine or could contain a glycol or other additive to lower the freezing point. Care must be taken, however, if the additives tend to have a deleterious effect upon the mold being dried in the fluidized bed. Thus, if the additive forms vapors which might damage the mold, it may be necessary to further improve mechanical separation in the direct chiller. If, for example, the coolant provides alcohol vapors in the drying air entering the fluidized bed, then there may or may not be a serious problem depending on the type of slurry used to coat the pattern.

The temperature controller associated with the sensing element 70 and the 3-way valve 63 may be adjusted to maintain the dew point at a predetermined value. Because 100% saturation is difficult to obtain, the temperature controller may be set to maintain the dew point of the air between 35° and 40° F., for example. This control is effected by mixing the refrigerated liquid from conduit 65 with the warmed liquid from conduit 60 and pumping the mixture of the two liquids through the pipe 56 to the spray nozzles 57. If the temperature of the air in the sensing element 70 is higher than is desired, the temperature controller automatically readjusts the valve 63 to admit more of the refrigerated liquid from the line 65, and when the temperature at 70 is lower than desired, the valve 63 is automatically adjusted in the opposite direction.

The air passing through the supply line 34 is is directed to the fluidized beds 10 to 13 through branch conduits as shown in FIGURE 3, the apparatus employed at each fluidized bed being exactly the same, except for the adjusted positions of the temperature controls. Because the structure is the same at each bed, a description of the parts associated with one bed applied to each of the other beds also.

The air from the supply line 34 passes through each branch conduit to a conventional flow meter indicated diagrammatically at 96, and a flow regulating valve 97 is provided so that the operator may adjust the rate of flow in accordance with the reading of the flow meter. When the valve 73 is set to the desired position, it maintains the desired rate of flow into the fluidized bed.

The various beds may be of various shapes and need not be separate. However, as herein shown, each bed is of generally cylindrical shape and has a flat horizontal bottom wall 98 and an integral upright cylindrical wall 99 provided with a pair of externally square and internally circular rigid plates 100 and 101 which support a cylindrical outer shell 102. The shell is rigidly attached to said plates to provide an airtight annular heating chamber 103 surrounding the bed.

The refractory material in the fluidized bed is preferably supported by a perforated or previous element, such as a wire screen or a woven or non-woven fabric, or other suitable means when operation of the bed is discontinued. As herein shown, a wire screen 180 is mounted on the ring 100 to provide a support for a conventional felt layer 131 which covers the bottom of the bed to assist in supporting the refractory body b. The thickness and porosity of the felt or other permeable material may be selected to provide the desired air distribution during operation of the bed.

A central chamber 104 is provided at the bottom center of each of the fluidized beds to receive the outlet end 105 of the branch conduit leading from the supply line 34. Said chamber 104 is defined by the walls of an annular heat exchanger 106 located at the bottom of each bed. Each heat exchanger has a flat horizontal circular top wall 107, an annular wall 108 rigidly mounted on the wall 98, and closely spaced vertical circular fins 109 mounted on the coil of the heat exchanger throughout its periphery. The walls 107 and 108 are rigidly held in position, and the air from the outlet 105 is, therefore, caused to flow radially outwardly over the fins 105 before it enters the chamber 112 surrounding the heat exchanger. Thus, the air is heated to the desired temperature by the heat exchanger 106 before it flows upwardly through the refractory body b of the fluidized bed.

In order to reduce the time required to bring the refractory body b up to operating temperature, it is preferable to provide an auxiliary heat exchanger 110 having coils 111 spirally wound around the wall 99 as shown in FIGURE 3. Such auxiliary heat exchanger may be heated with the same hot water that is used to heat the main heat exchanger 106.

As shown in FIGURE 3, all of the fluidized beds are supplied with hot water by a common hot water supply line 113 and such water is returned after use to the main source by a common return line 114. A conventional automatic 3-way mixing valve 115 and a water pump 116 are provided with each fluidized bed to cause the desired amount of water to pass through the branch conduits 117 and 118 to the inlet 119 of the heat exchanger 106. A branch conduit 120 having a manual valve 121 is provided to supply hot water to the coils 111 when the valve 121 is opened, and a return conduit 122 is connected to the outlet end of the heat exchanger 110. The outlet 123 of the main heat exchanger 106 is connected to the return conduit 122 and to the return conduit 124, and a short conduit 125 recirculates the water from the conduit 124 to the valve 115. The water passing through the conduit 124 is thus divided so that part recirculates through the mixing valve 115 and the remainder passes through the return pipe 126 to the return line 114. A one-way check valve 127 is provided to prevent the pump 116 from drawing water through the pipe 126.

The dry-bulb temperature of the air entering the bottom portion of each fluidized bed is regulated and maintained at the desired value by means of a conventional temperature controller 128 that is operably connected to the actuating element of the valve 115 and to the temperature sensing element 129. The regulation of temperature is effected in a conventional manner, the mixing valve being adjusted to admit more hot water from the conduit 117 and less of the cooler water from the conduit 125 when the temperature at 129 is below the desired temperature and being adjusted to admit more water from conduit 125 and less water from conduit 117 when the temperature at 129 is above the desired temperature. The structure of the sensing element 129, the line 130, the temperature controller 128 and the valve 115 is preferably the same at each of the fluidized beds, but the controllers 128 may be adjusted to provide a lower dry-bulb temperature for drying of the prime ceramic layer on the pattern than is provided when drying subsequent concrete ceramic layers.

In the apparatus shown herein, the air entering all of the fluidized beds is heated from a common source, the supply line 113, but the actual temperature of the drying air in the first bed may, for example, be maintained 5° F. or 10° F. below the temperature of the air in the other beds because each bed has an independent thermostatically controlled mixing valve. The temperature of the water in the supply line 113 may be 150° to 200° F. or higher, and such temperature should be substantially above the desired dry-bulb temperature of the air in each bed to obtain an adequate rate of heat transfer at the heat exchanger 106.

The auxiliary heat exchanger 110 may be supplied with water that is hotter than that supplied to the heat exchanger 106, but it is more convenient to supply both heat exchangers with water at the same temperature. When operation of the equipment is initiated, the valves 121 are opened manually to reduce the time required to bring the beds up to the desired temperature. Once the beds come up to temperature, the valves 121 may be partially or completely closed because the auxiliary heat exchangers are no longer necessary. A more uniform heating of the refractory bed *b* may, however, be obtained when some heat is supplied from the heat exchanger 110.

The patterns should be moved or agitated while they are submerged in the refractory material of the fluidized bed to obtain proper dusting and drying of all surfaces, particularly when the pattern has a complicated shape. It is preferable to support more than one pattern on each trolley, if they are not too big to fit into the fluidized bed, and to rotate both patterns simultaneously in opposite directions. It is also preferable to adjust the axes of rotation of the patterns.

Figure 6:
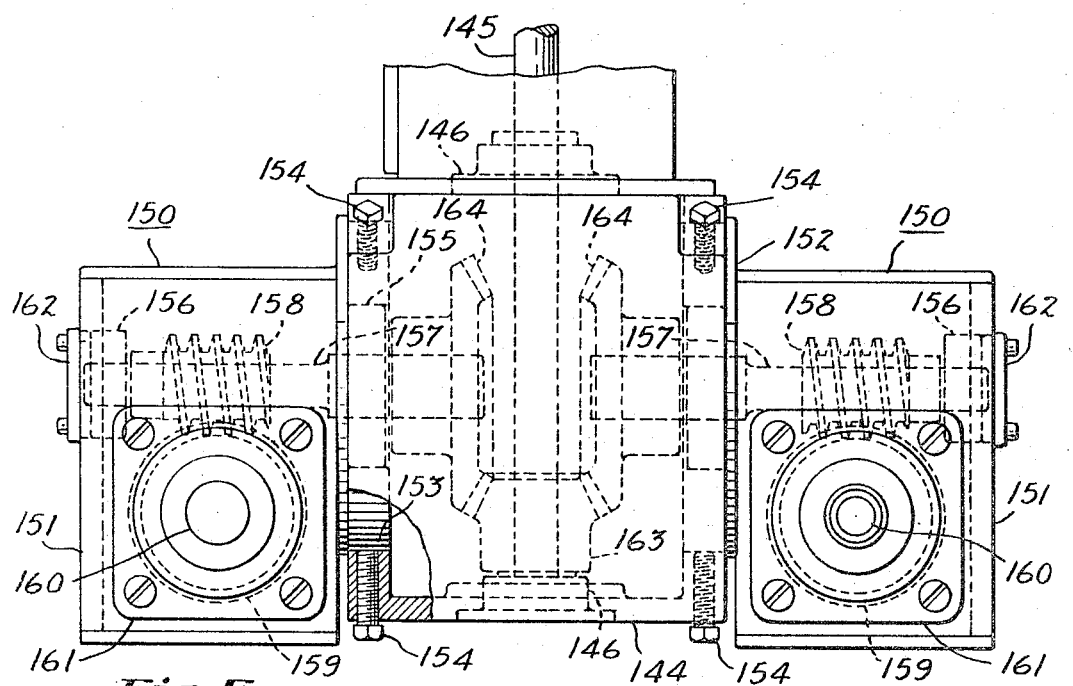
FIGURE 6 is a side elevational view of the rotator assembly.
Figure 7:
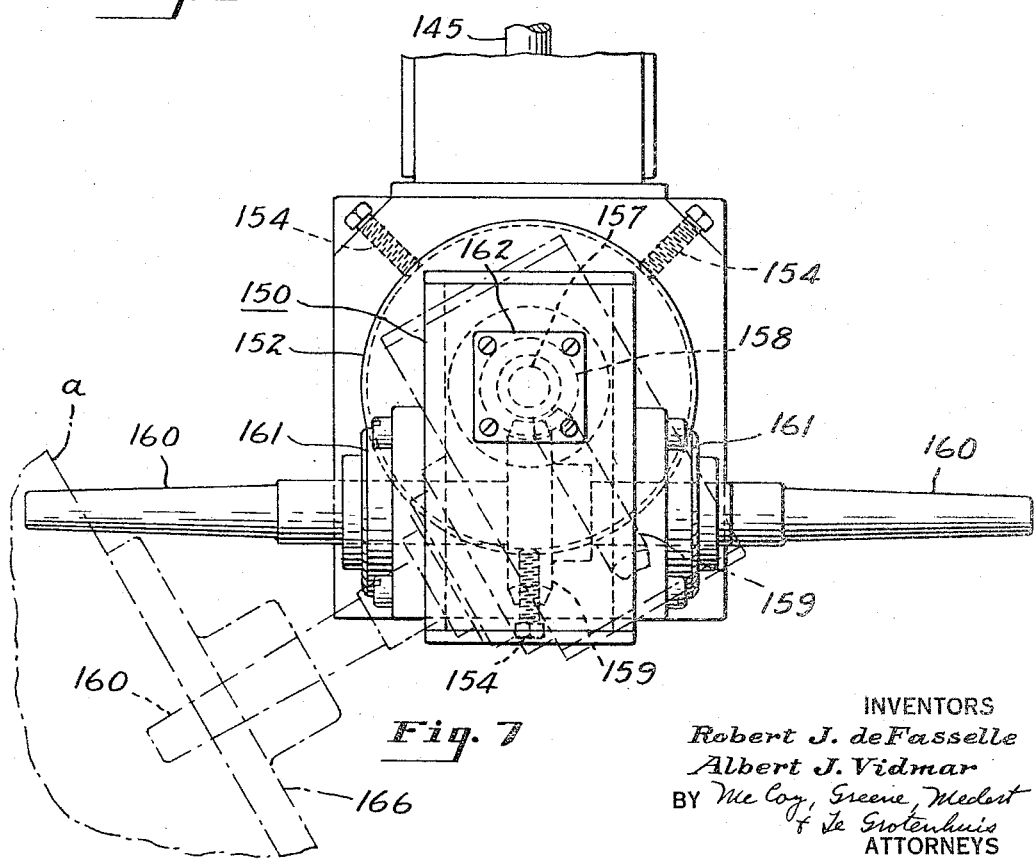
FIGURE 7 is an end view of the rotator assembly.

FIGURES 6 and 7 show an adjustable device for rotating two large wax patterns simultaneously, which is also shown on a smaller scale in FIGURES 2 and 3. This apparatus, which is carried by the hook 134, comprises a rotator assembly C having a rectangular main housing 144 with a vertical drive shaft 145 journaled therein at 146. A gear box 147 and an electric motor 148 (see FIGURES 2 and 3) are mounted on the top of the main housing, and a pair of generally rectangular swivel housings 150 are pivotally mounted on opposite sides of the main housing. Each swivel housing has a rectangular plate 151 at its outer end and a circular plate 152 at its inner end rigidly connected to an annular mounting portion 153 which fits inside a circular opening of the main housing 144. The housing is provided with a series of set screws 154 to lock each swivel housing in the desired adjusted position.

Bearings 155 and 156 are provided at opposite ends of each swivel housing 150 for rotatably supporting a shaft 157 having a worm gear 158 mounted thereon. The worm gear drives a pinion gear 159 carried by a shaft 160 which is journaled in bearing 161 and which extends outwardly from the swivel housing to provide a support for a removable pattern-supporting member 166. The pattern *a* is rigidly attached to the member 166 so that it rotates in unison with the shaft 160 during operation of the motor 148.

As herein shown, the assembly C has a central bevel gear or pinion 163 rigidly mounted on the vertical shaft 145 with its teeth meshing with the teeth of a pair of bevel gears 164, which drive the worm gear shafts 157 in opposite directions. A small end plate 162 is attached to the end plate 151 near the end of each shaft 157.

It is preferable to provide each rotator assembly C with a series of radially extending bumper guards 165 which extend outwardly of the patterns *a* but can be lowered into the top end portion of each fluidized bed, as shown in FIGURE 3, for example. These bumpers prevent engagement of the molds *a* with the rigid walls of the fluidized bed and also provide convenient handles for pulling the trolley 16 to the desired position.

Means are provided on each of the trolleys 16 for lowering the suspended patterns into the refractory body *b* of each fluidized bed, for reciprocating the patterns vertically while they are submerged in the refractory material, and for automatically raising the patterns out of the refractory material and above the bed after a predetermined period of time sufficient to remove the desired amount of moisture. As herein shown, each trolley 16 has hoisting means 132 including a cable 133 and a hook 134 suspended by a pulley 143 that is itself suspended by a looped cable. A reciprocating fluid motor or an electric motor may be provided to move the pulley. As herein shown, the hoisting means has an electric motor 135, which drives a suitable eccentric mechanism to reciprocate the pulley 143 and its cable vertically, and has a reversible electric motor 136 for raising and lowering that cable. A suitable semi-automatic control is provided for the motors including a three-position switch 138. The switch is located in the control box 137 which is connected to the vertical electrical conduit 131 and rigidly supported from the trolley.

Figure 5:
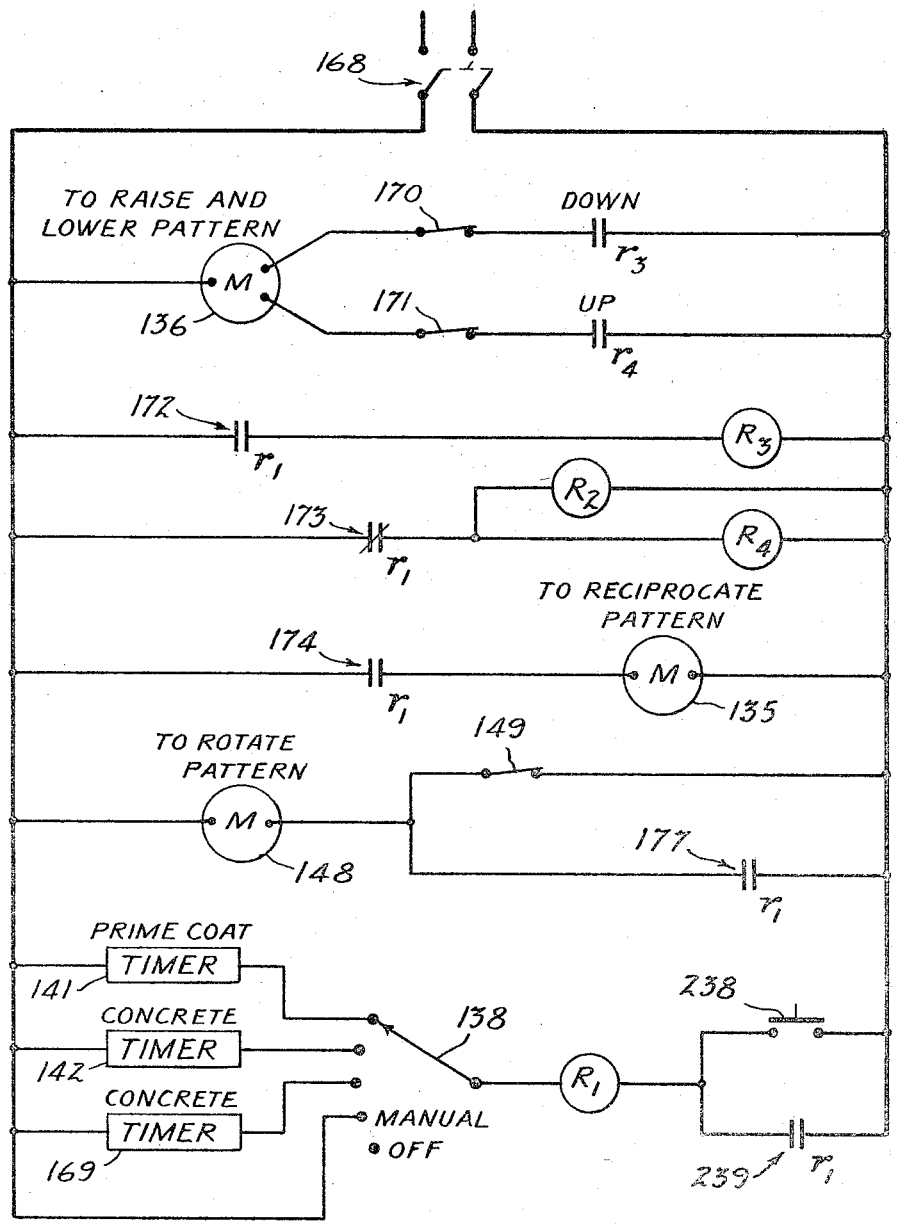
FIGURE 5 is a schematic electrical control diagram.

The electrical apparatus needed to perform the desired functions recited above may be of various types. The equipment shown in FIGURE 5 is intended to illustrate the principles of the invention schematically, but it will be understood that a somewhat different system might be desirable for commercial production. As shown in FIGURE 5, the selector switch 138 is in series with a relay $R_1$, and may be moved from its "OFF" position or its "MANUAL" position to a first closed position in series with the timer 141 or a second closed position in series with the timer 142. In either of these closed positions the relay $R_1$ is energized by depressing button 238 and effects closing of the normally open switches 172 and 174 and opening of the normally closed switch 173. A third timer 169 may also be employed if desired. The switch 239 controlled by relay $R_1$ provides a holding circuit to maintain flow of current through the relay $R_1$ when the button 238 is released. The button 238 is mounted on the control box 137 next to the switch 138.

When the electrical equipment carried by the trolleys is placed in operation, the main switch 168 and the manual switch 149 of each trolley are closed, the motor 148 of each trolley being operated continuously, except when it is stopped for removal of the pattern or for reloading by opening the switch 149. If desired, operation of each motor 148 may be initiated upon energizing the relay $R_1$, even when the switch 149 is left open by providing a normally open switch $r_1$ (177) in series with the motor and controlled by said relay.

After a pair of patterns have been placed on one of the trolleys 16 and the trolley is positioned directly above one of the fluidized beds, the manual switch 138 is moved to place the relay $R_1$ in series with one of the timers 141 and 142, and the button 238 is pushed. This energizes the relay $R_1$ and automatically effects closing of the switch 174 to start the motor 135 and thereby initiate a vertical reciprocation of the pattern through a short stroke (for example, a stroke of 1 to 3 inches).

The relay $R_1$ also opens the switch 173 and closes the switch 172 to energize the relay $R_3$, thereby closing the normally open switch $r_3$ and causing the motor 136 to lower the pattern into the fluidized bed. As the pattern is lowered the normally closed limit switch 171 is allowed to return to its closed position. When the pattern has been lowered the desired amount, the normally closed limit switch 170 is tripped and held open to stop the motor 136, whereby the pattern is submerged in the refractory material of the bed the proper amount during the drying operation in that bed.

After a predetermined period of time, such as 5 or 10 minutes, sufficient to remove most of the moisture from the refractory coated pattern, the timer 141 or 142, which is then in series with the relay $R_1$, automatically breaks the circuit to deenergize that relay and thereby effect opening of the normally open switches $r_1$ (172 and 174), closing of the normally closed switch $r_1$ (173), deenergizing of the relay $R_3$, and energizing of the relays $R_2$ and $R_4$. The relay $R_2$ resets the timers 141 and 142 for subsequent use.

The energizing of the relay $R_4$ closes the associated normally open switch $r_4$ and causes the motor 136 to raise the pattern out of the fluidized bed, and the opening of the switch 174 automatically stops the motor 135 to discontinue the vertical reciprocation. Raising of the pattern allows the then open limit switch 170 to return to its normal closed position. If the switch 149 is open, the deenergizing of the relay $R_1$ will open the switch 177 to stop the motor 148, but it is usually preferably to leave the switch 149 of each trolley closed until the pattern and the completed shell mold is removed from that trolley.

The pattern may be raised or lowered at any time and any desired amount (for example, when the patterns are being mounted or removed from the trolley) by placing the switch 138 in its "MANUAL" position, using the switch 238 to effect lowering and moving the switch 138 to its "OFF" position to effect raising of the patterns.

It will be apparent that the electrical equipment associated with each trolley 16 may be supplied with electric power through flexible electrical cables or through conventional stationary contacts located on the track above each fluidized bed. It will also be understood that various other mechanical or electrical devices may be used in performing the process of this invention and that the switches needed may be located in various accessible places. More than two timers may be used if it is desired to increase the drying time after drying of each ceramic layer of the shell mold or if it is desired to change the drying time because of the shape or size of the pattern. Also, the timers may be adjustable. These and other modifications of the apparatus will become apparent to anyone skilled in the art from the description of the process.

The setting of the timers 141 and 142 depends on the size and shape of the shell mold being produced and the degree of dryness desired. The timer 141, may, for example, be set for a drying time of 5 to 8 minutes, and the timer 142 may be set for a drying time of 10 to 15 minutes. The drying time should be adequate to produce a high quality shell mold, but it will be understood that the drying time may be adequate even though some residual free moisture remains in the ceramic layers on the pattern. Thus, in some cases, a drying time of only 5 minutes may be sufficient for the first ceramic layer applied to the wax pattern even though a longer drying time of 8 minutes would also provide a good product. The best product is usually obtained if at least 80% of the free liquid on the shell mold is evaporated during each drying step.

The present invention may be practiced using conventional refractory materials for dusting and using conventional ceramic slurries, as are commonly used, for example, in carrying out the process of said U.S. Patent No. 2,932,864. Thus, the refractory particles of the prime dip slurry are preferably small enough so that 100 percent will pass through a 200-mesh sieve, and the refractory particles of the concrete dip slurry preferably have a particle size such that no more than 50 percent can pass through a 200-mesh sieve. Each slurry employs a conventional binder, which may be ethyl silicate, colloidal alumina or colloidal zirconium, and such binder is preferably colloidal silica as disclosed, for example, in said Patent No. 2,932,864. The refractory material used in each slurry and used in the fluidized beds 10 to 13 may be any conventional material disclosed in said patent, such as zirconite, fused silica, aluminum silicate, zirconium silicate or alumina.

The size of the refractory particles used in the fluidized beds is not critical and may vary considerably, but such particles are preferably not so small as to create a serious dust problem or so large as to eliminate contact with the surfaces of the shell mold. Advantages of this invention could be obtained using, for example, a substantial amount of refractory particles which pass through a 100-mesh screen but are retained by a 140-mesh screen, but it is preferable to employ larger particles which will not pass through a 100-mesh screen so as to reduce the dust problem. Of course, a small particle size is less of a problem if effective dust removing equipment is used in conjunction with the fluidized beds. The maximum particle size depends to a large extent on the shape of the shell mold being formed, but generally it is impractical to provide the fluidized beds with substantial amounts of refractory particles too large to pass through a 20-mesh screen. Thus, the preferred range of particle sizes is −20 mesh to +100 mesh. Of course, the larger particles can be used more effectively where the apparatus is used for drying only rather than for dusting.

Each ceramic layer of the shell mold made by the process of this invention, including the refractory material applied by the slurry dip and the additional refractory material applied by dusting in the fluidized bed, preferably has a thickness between .03 inch and .2 inch. Such thickness is usually about .06 inch to about .1 inch. The major portion of this thickness is due to the particles applied by dusting.

In a typical process using equipment of the type shown herein, wherein the pattern is formed of wax, the slurry vehicle is water, and the slurry temperature is maintained at 80° F., for example, the first ceramic layer on the wax pattern may be dried 5 minutes or so in a fluidized bed having drying air with a dew point of 36° F. and a dry-bulb temperature of 85° F., and subsequent layers may be dried 10 minutes or so in another fluidized bed having drying air with a dew point of 36° F. and a dry-bulb temperature of 95° F. In such a process, the surface of the wax pattern may, for example, be maintained at all times at a temperature between 78° F. and 82° F. After the last ceramic layer has been partially dried like the other layers, the finished shell mold may be removed from the fluidized bed and stored in a separate drying room for 10 to 20 hours or so to dry the mold thoroughly. Such room could, for example, contain air with a dry bulb temperature of 80° or 85° and a relative humidity of about 20%.

While the size and shape of the equipment may obviously vary considerably, FIGURES 1 to 4, 6 and 7 have been drawn substantially to scale to facilitate an understanding of the invention. The slurry tanks 8 and 9, for example, may be provided with polyethylene inserts having an internal diameter of 44 inches. Mixers are not needed in these tanks to maintain the solids in suspension if conventional scraper bars are used because these tanks are continually rotated at about 30 revolutions per minute. The various fluidized beds 10 to 13 may have the same internal diameter as the tanks 8 and 9 or may be somewhat smaller as shown in the drawings.

The conditions used during operation of the apparatus shown herein may vary considerably, but typical conditions are given by way of example to illustrate the invention. For example, the room 1 may be provided with air having a dry-bulb temperature of 80° F. and a wet-bulb temperature of 67° F., the pattern temperature and the temperature of the ceramic slurries may be maintained at 80° F., the controller 128 of the bed 10 may be set to maintain a dry-bulb temperature of 85° F., and the controllers 128 of the beds 11, 12 and 13 may be set to maintain a dry-bulb temperature of 95° F. The controller 70 may be set to maintain the dew point of the air at about 36° F., the pressure in line 34 may be maintained at 5 p.s.i.g., and the hot water entering supply line 113 may be maintained at about 170° to 180° F.

When the apparatus is first placed in operation, the valves 121 may be opened to admit the hot water to the auxiliary heat exchanger 110 of each bed, and, after the beds reach the desired temperature, the valves may be closed.

A first pair of large wax patterns may then be mounted on the assembly C of a first trolley 16, and the motor 136 may be operated to elevate the patterns. The said first trolley is then moved by the operator to a position above the dip tank 8, which is rotated at 30 r.p.m., the switch 138 is moved to its "MANUAL" position, the switch 238 is operated manually to lower the wax pattern into the prime ceramic slurry, the switch 138 is moved to the "OFF" position to raise the coated pattern out of the tank, and the trolley is moved to a position above the bed 10.

The operator then moves the selector switch 138 to a closed position in series with the timer 141, which is set to provide a predetermined drying time, such as 6 minutes, and depresses the button 238. This energizes the relay $R_1$ to cause reciprocation of the patterns by the motor 135 through a short stroke, such as 2 or 3 inches, and to cause rotation of the patterns by the motor 148 at a speed of 30 r.p.m. for example. When the patterns are sufficiently dry for application of another ceramic layer, the timer 141 automatically breaks the circuit to cause the motor 136 to raise the patterns out of the bed 10.

Then the operator moves the trolley to the concrete dip tank 9, applies the second ceramic layer, and moves the coated patterns to the drying bed 11. Again the button 238 of trolley 16 is depressed to effect lowering of the patterns, but this time the switch 138 is moved to place the relay $R_1$ in series with the timer 142, which is set to provide a longer drying time, such as 12 minutes.

While the first pair of coated patterns are being lowered into the bed 11, the operator repeats the process with a second pair of wax patterns on a second trolley 16 using the dip tanks 8 and 9 and the bed 10 and, after applying the concrete ceramic layer at tank 9, moves the second trolley to a position above the bed 12. Again he moves the switch 138 associated with the second trolley to place the timer 142 in series with the relay $R_1$ and depresses the button 238 to initiate lowering of the pattern.

The time required to apply the first and second ceramic layers and to place the coated patterns in one of the concrete dip beds 11 to 13 is usually less than that required for drying in those beds. Therefore, a single person has time to work with a second pair of wax patterns while the first pair is being dried and can work continuously using the equipment of FIGURES 1 and 2 without wasting a substantial amount of time waiting for the coated patterns to dry.

When the timer 142 causes the elevation of a pair of patterns above one of the beds 11 to 13, the operator returns the trolley to a position above the dip tank 9, applies another layer of ceramic material by dipping, and returns the coated patterns to the same fluidized bed. Again he depresses the button 238 to effect another drying operation at that bed. If a third timer 169 is provided and a longer drying time is desired, such as 15 minutes, then the timer 169 may be used instead of timer 142.

When six or seven or any other desired number of ceramic layers have been built up on the patterns, the patterns are moved on the trolley to the unloading zone 22 and are allowed to dry. It is preferable to dry the finished shell mold 24 hours or so in air at a temperature of 80° to 85° F. having a relative humidity of about 20 percent before the wax is melted out of the mold.

The ceramic shell molds made by the process of this invention have a very high quality because of the uniform rapid drying in the fluidized beds. This rapid drying apparently prevents migration of the colloidal silica binder so that there is more uniform distribution of the binder in the ceramic layers and so that each layer is more permeable and better able to bond to the next layer. In any event, there is a better bond between layers and a stronger and more uniform shell mold than would be produced if the drying rate was reduced.

Thus, it has been discovered that an extremely high rate of drying is desirable, and the process of this invention can provide the drying air with extremely high velocities, such as to 10,000 or more feet per minute as shown by calculations based on the volume flow of air through the refractory material of the fluidized beds and the estimated overall size of the spaces between the refractory particles.

The fluidized bed can provide air velocities at the surface of the coated wax pattern in the range of 6000 to 10,000 feet per minute or higher. Furthermore, in a common commercial application the amount of energy needed to produce such high velocities is much less than that required in a tunnel system of the type shown in said Patent No. 2,932,864 because the total volume of air is much smaller.

The fluidized beds are particularly desirable when drying shell molds having complicated or complex shapes because the fluidized beds provide high air velocities at all points on the complex mold surface which could not possibly be provided by a drying tunnel. It is thus possible to obtain uniform drying of recessed areas of a coated wax pattern as well as exposed portions, particularly when the pattern is simultaneously rotated and reciprocated within the fluidized bed.

It will be understood that the above description is by way of illustration rather than limitation, and that, in accordance with provisions of the patent statutes, variations and modifications of the specific methods and devices disclosed herein may be made without departing from the spirit of the invention.

What is claimed is:

1. In a process of producing a refractory shell mold wherein a destructible pattern is alternately dipped in a ceramic slurry maintained at a predetermined temperature and placed in a drying atmosphere to evaporate the liquid slurry vehicle from the ceramic layers on the pattern, the improvement which comprises carrying out each drying step in a fluidized bed containing a body of refractory granules by forcing a conditioned drying gas upwardly through said refractory body to fluidize said body, maintaining the ceramic coated pattern in said body for a period of time sufficient to evaporate most of the free liquid carried on the coated pattern before the next application of wet slurry, maintaining the dry-bulb temperature of said conditioned gas above the pattern temperature, and regulating the condensable vapor content of said gas entering said body to prevent damage to the mold.

2. A process as defined in claim 1 wherein said pattern is suspended in the refractory body while being continually reciprocated vertically and turned about its axis.

3. A process as defined in claim 1 wherein the slurry vehicle comprises water, the slurry temperature is maintained at a predetermined value substantially below the melting point of the pattern material, the dry-bulb temperature of said drying gas is maintained at a predetermined value 5° to 50° F. above said slurry temperature, and the wet-bulb temperature of said drying gas is maintained at a predetermined value at least 5° F. below said slurry temperature.

4. A process as defined in claim 1 wherein the slurry vehicle comprises a halogenated hydrocarbon having up to 2 carbon atoms, the slurry temperature is maintained at a predetermined value substantially below the melting point of the pattern material, the dry-bulb temperature of said drying gas is maintained at a predetermined value about 10° to 100° F. above said slurry temperature, and the vehicle wet-bulb temperature of said drying gas is maintained at a predetermined value at least about 10° F. below the slurry temperature.

5. A process of forming a refractory shell mold on a mercury pattern comprising applying to the outer surface of the pattern a ceramic slurry containing a vehicle comprising a halogenated hydrocarbon to form a wet ceramic layer, the temperature of said slurry being maintained substantially below the melting point of the pattern material to prevent change in the shape of the pattern, dusting the wet coated pattern with refractory granules by placing it in a fluidized bed containing a body of said granules, and evaporating the slurry vehicle by forcing a conditioned gas upwardly through said body while maintaining the dry-bulb temperature of said gas entering said body at least 10° F. above the slurry temperature, maintaining the vehicle wet-bulb temperature of said gas entering said body at least 10° F. below said slurry temperature, and maintaining the dew point of said gas at no greater than about −100° F.

6. Apparatus for forming refractory shell molds for investment casting on destructible patterns comprising a dip tank containing a ceramic slurry comprising refractory particles and a liquid vehicle, means for maintaining the temperature of the slurry at a predetermined value below the softening temperature of the pattern, a fluidized bed having a receptacle containing a body of refractory granules, pressure means forcing a heated conditioned gas upwardly through said refractory body under a pressure sufficient to fluidize said body, suspending means for carrying the pattern from said dip tank to said fluidized bed and for continually moving the pattern vertically in the bed to cause the heated refractory granules to contact the entire outer surface of the ceramic layer applied to the pattern, and air conditioning means for maintaining the dry-bulb temperature of said gas at a predetermined value at least 5° F. above the slurry temperature and for maintaining the vehicle wet-bulb temperature of said gas at a predetermined value at least 5° F. below the slurry temperature.

7. Apparatus for forming refractory shell molds for investment casting comprising a dip tank containing a slurry of refractory particles and a fluidized bed having a receptacle containing a body of refractory granules; overhead conveyor means for lowering a destructible pattern into said slurry, raising the pattern above said dip tank, moving the suspended pattern to a position above said receptacle, and lowering the pattern to a suspended position in said refractory body; motor-driven means carried by said conveyor means for turning the pattern while it is submerged in the refractory granules; heating means providing said refractory body with a predetermined elevated temperature above the temperature of said slurry to effect rapid drying of the coated pattern; supply means for providing said receptacle with a gas and maintaining the vapor content of said gas within a predetermined range; and pressure means forcing said gas upwardly through the refractory body under a pressure sufficient to fluidize said body to effect dusting of the wet-ceramic-coated pattern with said refractory granules while simultaneously effecting rapid drying of the pattern.

8. In an apparatus for mass producing refractory shell molds for investment casting by repeatedly dipping destructible patterns in ceramic slurries, dusting the wet patterns with refractory granules and drying the patterns, in combination, a fluidized bed comprising a receptacle containing a body of refractory granules, overhead conveyor means for suspending a dipped pattern, motor-driven means carried by said conveyor means for moving the pattern vertically from an upper position above said receptacle to a lower position in said receptacle, means carried by said conveyor means for turning the pattern and for simultaneously reciprocating the pattern vertically in said refractory body, heating means providing said fluidized bed with a predetermined elevated temperature above the pattern temperature, means providing a source of conditioned drying gas and maintaining the vapor content of said gas within a predetermined range, and pressure means forcing said gas upwardly through the refractory body under pressure to provide said fluidized bed and to effect rapid drying of the coated pattern while simultaneously dusting the wet pattern with dry refractory granules from said body.

9. Apparatus as defined in claim 8 wherein timer means are provided for controlling said motor-driven means to initiate raising of the pattern out of said refractory body from its lower position automatically after a predetermined period of time.

10. In an apparatus for mass producing refractory shell molds having a plurality of dip tanks, each containing a refractory slurry having a predetermined temperature, a series of fluidized beds, each bed comprising a receptcle containing a body of refractory granules, conveyor means for suspending a destructible pattern and moving the pattern to the dip tanks and to all of said beds, drying means providing a source of cooled conditioned drying air having a humidity within a predetermined range, separate heating means for each of said fluidized beds having control means maintaining the granules in that bed at a predetermined elevated temperature substantially higher than the temperature of the refractory slurries, the control means for the first fluidized bed providing that bed with a temperature at least 10° F. lower than the temperature of another of said beds, and pressure means forcing said conditioned air upwardly through the refractory body of each fluidized bed under pressure to fluidize the bed and to effect rapid drying of the coated pattern in each bed while simultaneously dusting the wet pattern with dry refractory granules.

11. An apparatus as defined in claim 10 wherein said pressure means supplies air from a common source to all of said beds at substantially the same constant pressure, refrigerating means are provided for removing moisture from said air, a common control means maintains the dew point of the air entering all of said beds at a substantially constant value, and timer means are provided on said conveyor means to raise the pattern out of each fluidized bed automatically after a predetermined period of time.

12. Apparatus for mass producing shell molds on destructible patterns comprising a pair of rotatable dip tanks, each containing a ceramic slurry at a predetermined temperature, and a plurality of fluidized beds, each comprising a receptacle containing a body of refractory granules and having independent heating means for maintaining the temperature of said body within a predetermined range above the temperature of each of the ceramic slurries, an overhead conveyor for supporting a pattern and for carrying the pattern over said pair of dip tanks and over said fluidized beds, motor-driven means carried by said conveyor for raising and lowering the pattern and for turning the pattern when it is submerged, automatic timer means for controlling said motor-driven means to hold the dipped ceramic-coated pattern in a lower position in the refractory granules of each fluidized bed for a predetermined period of time, air conditioning means for supplying cooled air to each of said beds and for maintaining the vapor content of the air at a predetermined value, and pressure means for forcing the conditioned air upwardly through the refractory body of each receptacle to fluidize the bed and to effect rapid drying of the pattern therein.

13. A process for simultaneously producing a plurality of refractory shell molds on a plurality of destructible patterns comprising the steps of (a) suspending the patterns on separate overhead conveyors, each having means for lowering the pattern, motor-driven means for turning the pattern, and timer means for automatically lifting the pattern after a predetermined period of time; (b) moving one conveyor to a position above a prime dip tank containing a prime ceramic slurry; (c) lowering the first pattern into said prime slurry; (d) removing the coated pattern from said dip tank and moving it with said one conveyor to a position above a first fluidized bed containing a body of refractory granules; (e) lowering said first pattern into the refractory body of said bed and maintaining the pattern in said bed while (f) turning the pattern continually and (g) forcing heated conditioned gas upwardly through said refractory body to fluidize said bed and to evaporate the slurry vehicle from the first ceramic-coating on said pattern; (h) maintaining the dry-bulb temperature and vapor content of the gas entering said bed at predetermined values to prevent damage to said first coating; (i) removing the first pattern from said bed and returning it with said one conveyor to a position above said prime dip tank; (j) repeating steps (c) to (h) to form a second layer on said first pattern; (k) removing the first pattern from the bed and moving it with said one conveyor to a position above a concrete dip tank containing a concrete ceramic slurrry; (l) lowering said first pattern into said concrete slurry; (m) removing the coated first pattern from said concrete dip tank and moving it with said one conveyor to a position above another fluidized bed containing a body of refractory granules; (n) lowering said first pattern into the refractory body of said last-named bed and (o) causing said motor-driven means of said one conveyor to turn the pattern in said body for a period of time as determined by the timer means of said one conveyor, said timer means automatically causing the pattern to be lifted out of said last-named bed after said last-named period; (p) removing said first pattern from said last-named bed and returning it with said one conveyor to a position above said concrete dip tank; (q) repeating steps (l) to (n) inclusive, to form additional layers of the shell mold on said first pattern; (r) performing steps (b) to (h), inclusive, with a second pattern suspended on the other of said conveyors immediately after performing step (n) with the first pattern; (s) performing steps (i) to (q), inclusive, with said second pattern and said other conveyor using a fluidized bed which is not occupied by said first pattern to form a shell mold on said second pattern having several layers before completing the shell mold on said first pattern, said concrete dip tank alternately receiving said first pattern and said second pattern as the concrete layers of the shell molds are simultaneously built up on both patterns.

14. A process as defined in claim 13 wherein steps (b) to (h), inclusive, are performed with a third pattern suspended on a third of said conveyors after performing step (n) with the second pattern and steps (i) to (p), inclusive, are performed with said third pattern and said third conveyor using a fluidized bed which is not occupied by said first and second patterns before completing the shell molds on the latter patterns, three shell molds being formed simultaneously by one operator using only one prime dip tank and only one concrete dip tank.

15. A process for producing a refractory shell mold on a destructible pattern comprising the steps of applying a ceramic slurry to the outer surface of the pattern to form a wet ceramic layer, placing the coated pattern in a fluidized bed containing a body of refractory granules, rapidly removing the slurry vehicle from the coated pattern by forcing a conditioned gas upwardly through said refractory body under pressure to fluidize said body while maintaining the dry-bulb temperature and the condensable vapor content of said gas entering said body at predetermined values to maintain the dry-bulb temperature of said gas entering said body at a predetermined value above the temperature of the pattern and to maintain the vehicle wet-bulb temperature of said gas entering said body at a predetermined value below the temperature of the pattern to prevent damage to the mold by overcooling, and removing the pattern from the refractory body.

16. A process for producing a refractory shell mold on a pattern formed of wax, mercury or other destructible material comprising the steps of applying to the outer surface of the pattern a ceramic slurry, which comprises refractory particles and a liquid vehicle, to form a ceramic layer on the pattern, placing the wet coated pattern in a fluidized bed containing a body of refractory granules, rapidly removing the slurry vehicle from the coated pattern by forcing a conditioned gas upwardly through said refractory body under pressure to fluidize said body while continually imparting motion to said pattern and while maintaining the dry-bulb temperature and condensable vapor content of said gas entering said body within predetermined ranges to prevent damage to the shell mold, removing the pattern from the refractory body after a major portion of the free liquid has been removed from the pattern, applying at least one additional layer of ceramic slurry, and drying the pattern, the slurry temperature being maintained below the melting point of the pattern material, the dry-bulb temperature of said conditioned gas being maintained at least 5° F. above the slurry temperature, and the vehicle wet-bulb temperature of said conditioned gas being maintained at least 5° F. below the slurry temperature.

17. In a process for producing a refractory shell mold wherein a destructible pattern is repeatedly dipped in a ceramic slurry and dusted with refractory granules to form a series of ceramic layers and is heated after each dipping and dusting operation to remove most of the slurry vehicle from the ceramic layers on the pattern, the improvement which comprises completing both the dusting and drying operation simultaneously after each application of the ceramic slurry by placing the wet coated pattern in a fluidized bed containing a body of said refractory granules, continually imparting motion to said pattern, and forcing a conditioned drying gas through said refractory body to fluidize said bed and evaporate the slurry vehicle from the ceramic layers, the dry-bulb temperature of said gas entering said body being maintained at a predetermined value above the temperature of the pattern, the vehicle wet-bulb temperature of said gas entering said body being maintained at a predetermined value below the temperature of the pattern to prevent damage to the mold by over-cooling.

References Cited by the Examiner

UNITED STATES PATENTS

| | | |
|---|---|---|
| 2,123,537 | 7/1938 | Marr. |
| 2,932,864 | 4/1960 | Mellen et al. 22—196 |
| 2,954,643 | 10/1960 | Porter et al. 34—10 |
| 3,165,799 | 1/1965 | Watts 22—196 |
| 3,171,174 | 3/1965 | Mellen et al. 22—196 |
| 3,212,197 | 10/1965 | Crawford 23—10 |

FOREIGN PATENTS 236,261  11/1961  Australia.

OTHER REFERENCES

Chem. Eng. Progress, July 1960, pp. 75–78.
Precision Metal Molding, June 1960, p. 31.

J. SPENCER OVERHOLSER, *Primary Examiner.*

MARCUS U. LYONS, *Examiner.*

E. MAR, *Assistant Examiner.*